United States Patent [19]

Mennemann et al.

[11] Patent Number: 4,562,161

[45] Date of Patent: Dec. 31, 1985

[54] OPTICAL AND OPHTHALMIC GLASS WITH REFRACTIVE INDICES GREATER THAN OR EQUAL TO 1.56, ABBE NUMBERS GREATER THAN OR EQUAL TO 40 AND DENSITIES LESS THAN OR EQUAL TO 2.70 G/CM$^3$

[75] Inventors: Karl Mennemann, Taunusstein; Georg Gliemeroth, Mainz-Finthen; Ludwig Ross, Klein-Winternheim; Burkhard Speit, Mainz-Mombach; Volkmar Geiler, Mainz-Finthen; Hans-Georg Krolla, Mainz; Lothar Meckel, Oestrich-Winkel, all of Fed. Rep. of Germany

[73] Assignee: Schott Glaswerke, Mainz, Fed. Rep. of Germany

[21] Appl. No.: 467,722

[22] Filed: Feb. 18, 1983

[30] Foreign Application Priority Data

Feb. 20, 1982 [DE] Fed. Rep. of Germany ....... 3206226
Feb. 20, 1982 [DE] Fed. Rep. of Germany ....... 3206227

[51] Int. Cl.$^4$ ................................................. C03C 3/08
[52] U.S. Cl. ........................................ 501/59; 501/58; 501/61; 501/62; 501/63; 501/64; 501/65; 501/66; 501/67; 501/903
[58] Field of Search .................. 501/58, 59, 61, 62, 501/63, 64, 65, 66, 67, 903

[56] References Cited

U.S. PATENT DOCUMENTS

| | | | |
|---|---|---|---|
| 2,433,883 | 1/1948 | Armistead | 501/903 |
| 3,420,648 | 1/1969 | Andrews et al. | 501/903 |
| 3,790,260 | 2/1974 | Boyd | 501/903 |
| 3,951,671 | 4/1976 | Parry et al. | 501/903 |
| 3,997,250 | 12/1976 | Krohn et al. | 501/903 |
| 4,367,012 | 1/1983 | Ikeda et al. | 501/903 |

FOREIGN PATENT DOCUMENTS

| | | | |
|---|---|---|---|
| 63790 | 11/1982 | European Pat. Off. | 501/903 |
| 56-59640 | 5/1981 | Japan | 501/903 |
| 2029401 | 3/1980 | United Kingdom . | |
| 2106891 | 4/1983 | United Kingdom | 501/903 |

*Primary Examiner*—Mark L. Bell
*Attorney, Agent, or Firm*—Millen & White

[57] ABSTRACT

An optical and ophthalmic glass with high refractive index, high Abbe number and low density, which is distinguished by good chemical stability, good crystallization behavior and capability for chemical hardening, comprises (in % by weight):

$SiO_2$—47 to 75
$B_2O_3$—1 to 20
$Al_2O_3$—0 to 10
$P_2O_5$—0 to 5
$Li_2O$—0 to 15
$Na_2O$—0 to 10
$K_2O$—0 to 10
$CaO$—0 to 20
$MgO$—0 to 15
$SrO$—0 to 4
$BaO$—0 to 4
$ZnO$—0 to 5
$TiO_2$—1 to 15
$ZrO_2$—0 to 8
$Nb_2O_5$—0 to 5 and
F——0 to 5.

12 Claims, No Drawings

OPTICAL AND OPHTHALMIC GLASS WITH REFRACTIVE INDICES GREATER THAN OR EQUAL TO 1.56, ABBE NUMBERS GREATER THAN OR EQUAL TO 40 AND DENSITIES LESS THAN OR EQUAL TO 2.70 G/CM³

BACKGROUND OF THE INVENTION

In addition to the main properties of high refractive index and high Abbe number at low density, optimal, ophthalmic glass must have further important properties in order to be useful as glass for spectacle lenses. For medical reasons such a glass should not be transparent to UV rays having a wavelength less than 350 nm. On the other hand, it must not exhibit any kind of absorption in the visible spectrum since otherwise the glass would have an undesired color of its own.

Another important property in a mass-produced glass of this kind is that it be readily producible in appropriately large melt units (tank glass) and be capable of subsequent treatment or processing into machine-producible pressings. To this end the glass must have only a very small tendency toward crystallization. Particularly in the temperature-/viscosity-range of such processing below $10^4$ d Pa s, there must be no devitrification phenomena.

For the sake of the personal safety of the wearer of such spectacles, such a glass must have very good chemical hardenability. This property at the same time allows further reductions to be achieved in the thickness of the lens glass thus affording a lighter spectacle weight.

Another important requirement to be met by the glass is that of good chemical stability. The glass composition must be such that, during the processing or treatment of the glass by grinding, polishing and washing as well as in ultimate use of the glass in spectacle lenses, aggressive media such as acids, fruit juices, perspiration, etc. will not visibly attack the glass surface even over prolonged periods of time.

The current state of the art is comprehensively described in German Patent DEOS No. 31 39 212. In this publication is disclosed for the first time a composition range for an optical and ophthalmic glass having a refractive index greater than or equal to 1.58, an Abbe number greater than or equal to 45, and a density less than or equal to 2.75 g/cm³ as well as an excellent capability for chemical hardening. All previous patents relating to glasses in the refractive index range of 1.55 to 1.60 and the Abbe number range greater than 45 (e.g., JP-OS No. 79.10882 and GB-OS No. 20 29 401), however, do not permit within their composition ranges the production of glasses having a density less than 2.70 with a refractive index of 1.60 and an Abbe number of 50. However, the composition range according to German Patent DEOS No. 31 39 212, unlike that of this invention, is deficient insofar as it fails to fulfill the demands for corresponding UV absorption, high crystallization stability and chemical hardenability at the same time. Particularly in regard to absorption behavior in the UV range, no information was given in this reference, however, according to the latest medical knowledge, this is a particularly important aspect in a glass for spectacle glasses. Glasses which fall into the composition range specified in this patent either have unduly high UV transmissivity for a low titanium content or, with a higher titanium content, achieve strong UV absorption but already show coloration in the visible range of the spectrum. In order to satisfy simultaneously all of the given requirements, it is therefore necessary to provide a new composition range.

SUMMARY OF THE INVENTION

Accordingly, it is an object of this invention to provide a glass composition which overcomes or greatly ameliorates the mentioned deficiencies and achieves the mentioned properties, e.g., to provide a composition range for an optical and an ophthalmic glass with a refractive index greater than or equal to 1.56, an Abbe number greater than or equal to 40 and a density less than or equal to 2.70 g/cm³, the glass also essentially completely absorbing the transmission of UV rays in the range below 340–390 nm, being capable of being chemically hardened in an alkali bath, being stable to dilute acids and leaches and showing essentially no crystallization in the viscosity range of less than $10^4$ d Pa s.

Upon further study of the specification and appended claims, further objects and advantages of this invention will become apparent to those skilled in the art.

These objects have been attained by providing optical and ophthalmic glass with a refractive index greater than or equal to 1.56, an Abbe number greater than or equal to 40 and a density less than or equal to 2.70 g/cm³, comprising (in % by weight):

$SiO_2$—47 to 75
$B_2O_3$—1 to 20
$Al_2O_3$—0 to 10
$P_2O_5$—0 to 5
sum of $SiO_2$, $B_2O_3$, $Al_2O_3$ and $P_2O_5$—57 to 85
$Li_2O$—0 to 15
$Na_2O$—0 to 10
$K_2O$—0 to 10
sum of $M_2O$ (M=Li, Na, K)—5 to 17
$CaO$—0 to 20
$MgO$—0 to 15
$SrO$—0 to 4
$BaO$—0 to 4
$ZnO$—0 to 5
$TiO_2$—1 to 15
$ZrO_2$—0 to 8
$Nb_2O_5$—0 to 5
F—0 to 5.

In various preferred aspects, this invention relates to glasses comprising:
$SiO_2$—65 to 75
$B_2O_3$—1 to 6
$Al_2O_3$—1 to 3
sum of $SiO_2$, $B_2O_3$ and $Al_2O_3$—70 to 80
$Li_2O$—3 to 7
$Na_2O$—4 to 6
$K_2O$—0 to 6
sum of $Li_2O$, $K_2O$ and $Na_2O$—8 to 14
$CaO$—0 to 5
$MgO$—0 to 4
$ZnO$—0 to 3
sum of $CaO$, $MgO$ and $ZnO$—1.5 to 6
$TiO_2$—8 to 15
$ZrO_2$—0 to 3
$Nb_2O_5$—0 to 3
F—0.4 to 9 or comprising:
$SiO_2$—49 to 68
$B_2O_3$—8 to 14
$Al_2O_3$—0.5 to 3
$GeO_2$—0 to 3

$P_2O_5$—0 to 1.5
sum of $SiO_2$, $B_2O_3$, $Al_2O_3$ and $P_2O_5$—60 to 75
$Li_2O$—6 to 12
$Na_2O$—0.5 to 4.5
$K_2O$—0 to 2
sum of $Li_2O$, $K_2O$ and $Na_2O$—8 to 15
$MgO$—1 to 6
$CaO$—2 to 8
$ZnO$—0 to 5
sum of $MgO$, $CaO$, $ZnO$—3 to 18
$TiO_2$—4 to 9.5
$ZrO_2$—0 to 3
$Nb_2O_5$—0.3 to 5
$NaF$—1 to 3.5
$Y_2O_3$—0 to 4
or comprising:
$SiO_2$—47 to 58
$B_2O_3$—12 to 16
$Al_2O_3$—0.5 to 2
sum of $SiO_2$, $B_2O_3$ and $Al_2O_3$—68 to 78
$Li_2O$—10 to 15
$Na_2O$—4 to 6
$K_2O$—0 to 1
sum of $Li_2O$, $K_2O$ and $Na_2O$—15 to 17
$CaO$—4 to 8
$MgO$—4 to 7
$ZnO$—0 to 1
sum of $CaO$, $MgO$ and $ZnO$—8 to 14
$TiO_2$—7 to 10
$ZrO_2$—0 to 2
$Nb_2O_5$—0 to 2
$F$—0.4 to 1
or comprising:
$SiO_2$—47 to 51
$B_2O_3$—10 to 18
$Al_2O_3$—0 to 4
sum of $SiO_2$, $B_2O_3$ and $Al_2O_3$—58 to 62
$Li_2O$—4 to 12
$Na_2O$—2 to 6
$K_2O$—0 to 4
sum of $Li_2O$, $K_2O$ and $Na_2O$—8 to 16
$CaO$—1 to 7
$MgO$—0 to 5
$ZnO$—0 to 4
sum of $CaO$, $MgO$ and $ZnO$—5 to 12
$TiO_2$—5 to 8
$ZrO_2$—0 to 2
$Nb_2O_5$—0 to 3
$F$—0.4 to 1
As well, this invention relates to a glass comprising:
$SiO_2$—47 to 75
$B_2O_3$—1 to 20
$Al_2O_3$—0 to 10
$P_2O_5$—0 to 5
sum of $SiO_2$, $B_2O_3$, $Al_2O_3$ and $P_2O_5$—57 to 85
$Li_2O$—0 to 15
$Na_2O$—0 to 10
$K_2O$—0 to 10
sum of $M_2O$ (M=Li, Na, K)—5 to 17
$CaO$—0 to 20
$MgO$—0 to 15
$SrO$—0 to 4
$BaO$—0 to 4
$ZnO$—0 to 5
$TiO_2$—1 to 15
$ZrO_2$—0 to 8
$Nb_2O_5$—0 to 5
$F$—0 to 5
$Nb_2O_5$—0 to 5
$Y_2O_3$—0 to 4
$La_2O_3$—0 to 8
$Ta_2O_5$—0 to 3
$SnO_2$—0 to 3.0 in addition to or instead of NaF
$Bi_2O_3$—0 to 2.0
$Yb_2O_3$—0 to 3.5
$Ce_2O_3$—0 to 3
$Sb_2O_3$—0 to 2.5
$TeO_2$—0 to 2
$SeO_2$—0 to 2
$WO_3$—0 to 5
$PbO$—0 to 5
$GeO_2$—0 to 3.

DETAILED DISCUSSION

Such a range is characterized in that the sum of all vitrifying oxides amounts to from 57 to 85% by weight, with the following being present (% by weight):
$SiO_2$—47 to 75
$B_2O_3$—1 to 20
$Al_2O_3$—0 to 10
$P_2O_5$—0 to 5;
preferably, however, 60 to 75% by weight vitrifiers, present as follows (% by weight):
$SiO_2$—49 to 68
$B_2O_3$—8 to 14
$Al_2O_3$—0.5 to 3
$GeO_2$—0 to 3
$P_2O_5$—0 to 1.5.

The sum of the alkali metal oxides is 5–15% by weight, but preferably 8–15% by weight, present as follows in combination (a) or (b) (% by weight):

|  | (a) | (b) |
|---|---|---|
| $Li_2O$ | 4 to 15 | 6 to 12 |
| $Na_2O$ | 0 to 6 | 0.5 to 4.5 |
| $K_2O$ | 0 to 2. | 0 to 2 |

The sum of the alkaline earth metal oxides and ZnO is generally 2–25% by weight, preferably 3–18% by weight, e.g., (% by weight):
$CaO$—1 to 20
$MgO$—0 to 15
$ZnO$—0 to 5
or respectively
$CaO$—2 to 8
$MgO$—1 to 6
$ZnO$—0 to 5,
and besides generally contains no more than 10% by weight of the sum of SrO, BaO, ZnO and PbO. Further components correspond to (% by weight):
$TiO_2$—1 to 15, preferably 4 to 9.5
$ZrO_2$—0 to 8, preferably 0 to 3
$F$—0 to 5, preferably 1 to 3.5% by wt., e.g., by addition of NaF.
Moreover, even further oxides which may be present are as follows (% by weight):
$Nb_2O_5$—0 to 5
$Y_2O_3$—0 to 4
$La_2O_3$—0 to 8
$Ta_2O_5$—0 to 3
$SnO_2$—0.1 to 3.0 in addition to or instead of NaF
$Bi_2O_3$—0 to 2.0
$Yb_2O_3$—0.1 to 3.5
$Ce_2O_3$—0 to 3
$Sb_2O_3$—0 to 2.5

$TeO_2$—0 to 2
$SeO_2$—0 to 2
$WO_3$—0 to 5.

In general, for any limitation herein of a 0% lower limit, when the corresponding optional ingredient is in fact present, a suitable minimum amount is about 0.1%. Moreover, other suitable end point ranges for this invention include amounts within the range which differ from the stated end points by additive/substractive factors of, e.g., 0.5, 1.0, 1.5, 2.0, 2.5, 3, 3.5, etc.

In the glasses according to this invention are combined the fulfillment of the demand for high refractive index and high Abbe number at lowest density, as well as excellent crystallization behavior, chemical hardenability, chemical stability and a sharp UV absorption limit at 340-390 nm. It thus significantly exceeds the properties of the mentioned prior art glasses. For example, compared with the examples given in DEOS No. 31 39 212 of Oct. 2, 1981, crystallization stability is essentially improved if a higher sodium content of about 3 to 5% by weight in respect of $Na_2O$ is introduced. At the same time, this $Na_2O$ content also improves chemical hardenability in an Na- or K-saline bath with a simultaneous shortening of immersion time.

The high Abbe number demanded in DEOS 31 39 212 is not really necessary since the color fringes occur in spectacle lenses upwards of a $v_d$ less than 42 and may disturb the wearer of the spectacles. It is therefore possible, by increasing the $TiO_2$ content up to 10% by weight, to shift the ratio of refractive index to density in the direction of lower density and higher $n_d$. The Abbe number then drops to about 45–42.

By an addition of at least 0.4% by weight of fluoride (e.g., in the form of NaF) related to the F-ion amount, a correspondingly steep UV absorption limit or edge with 80% reduction of transmission over a wavelength increment of 15–30 nm is obtained. The actual position of this edge may be shifted into the desired range (340 to 390 nm), depending on the composition of the basic glass, by addition of the component oxides of Sr, Ba, Pb, Zn, La, W, Ta, Sm, Bi, Yb, etc., especially in combinations of SrO—0 to 9
BaO—0 to 4
PbO—0 to 5
or
$La_2O_3$—0 to 8
$WO_3$—0 to 5
$Ta_2O_5$—0 to 3
or
$SnO_2$—0.1 to 3.0

$Bi_2O_3$—0 to 2.0.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Table 1 comprises 10 examples of embodiments in a preferred composition range of this invention; Table 2 shows nine further examples.

The glasses according to the invention were conventionally produced as follows:

The raw materials (oxides, carbonates, nitrates, fluorides) are weighed. A refining agent such as $As_2O_3$ is added in an amount equal to 0.1–1% by weight, and all is then thoroughly mixed. The glass mix is melted down at about 1300° to 1400° C. in a ceramic tank or platinum crucible, then refined and well homogenized by means of an agitator. At a casting temperature of about 800° C. and with a viscosity of about 3000 d Pa s, the glass is then pressed into blanks for spectacle lenses.

| Smelting example for 1000 kg calculated glass | | | |
|---|---|---|---|
| Oxide | % by weight | Raw material | Amount weighed out (kg) |
| $SiO_2$ | 56.50 | Sipur | 567.75 |
| $B_2O_3$ | 12.20 | $H_3BO_3$ | 217.89 |
| $Li_2O$ | 9.00 | $Li_2CO_3$ | 225.00 |
| $Li_2O$ | 0.89 | $LiNO_3$ | 41.21 |
| $Na_2O$ | 2.00 | $Na_2CO_3$ | 34.32 |
| MgO | 4.27 | $MgCO_3$ | 97.71 |
| CaO | 4.50 | $CaCO_3$ | 81.82 |
| $Al_2O_3$ | 1.50 | AlO OH | 20.40 |
| $TiO_2$ | 6.61 | $TiO_2$ | 66.56 |
| $ZrO_2$ | 0.49 | $ZrO_2$ | 4.92 |
| $Nb_2O_5$ | 0.68 | $Nb_2O_5$ | 6.85 |
| NaF | 1.10 | NaF | 11.20 |
| | | | 1375.63 kg |
| | $+As_2O_3$ | | 1.80 kg refining agent |
| | | | 1377.43 kg mix |

The properties of this glass are shown in Table 1, Example 2.

For chemical hardening, the ground and polished glasses are immersed for four hours in a molten bath of $NaNO_3$ at 400° C. The exchanged layer has a thickness of 83 micrometers and a compressive stress of 7260 nm/cm.

TABLE 1

| | Examples of Embodiments (Contents in weight %) | | | | | | | | | |
|---|---|---|---|---|---|---|---|---|---|---|
| | 1 | 2 | 3 | 4 | 5 | 6 | 7 | 8 | 9 | 10 |
| $SiO_2$ | 63.80 | 56.50 | 64.61 | 57.79 | 51.86 | 65.53 | 49.52 | 49.10 | 51.52 | 67.62 |
| $B_2O_3$ | 8.14 | 12.20 | 2.01 | 9.47 | 15.00 | 8.48 | 9.70 | 15.00 | 11.77 | 1.05 |
| $Al_2O_3$ | 1.64 | 1.50 | 1.66 | — | — | 1.10 | 1.25 | 5.00 | 1.05 | — |
| $P_2O_3$ | — | — | — | — | — | — | — | — | 1.15 | — |
| $Li_2O$ | 10.21 | 9.89 | 11.54 | 12.67 | 12.83 | 11.08 | 10.20 | 6.00 | 7.37 | 8.57 |
| $Na_2O$ | 3.20 | 2.00 | 2.02 | — | — | 2.00 | 3.72 | 2.01 | 4.74 | 5.90 |
| $K_2O$ | — | — | — | — | — | — | — | — | 1.00 | 0.25 |
| MgO | 3.75 | 4.27 | 2.64 | 6.46 | 6.20 | 1.31 | 4.25 | 4.84 | 4.18 | 2.84 |
| CaO | 1.81 | 4.50 | 1.83 | 7.19 | 7.06 | 1.82 | 6.81 | 0.85 | 9.33 | 4.03 |
| ZnO | — | — | — | — | — | — | — | 2.00 | — | 2.97 |
| $TiO_2$ | 5.01 | 6.61 | 4.57 | 4.08 | 4.52 | 6.30 | 11.23 | 7.01 | 5.62 | 4.15 |
| $ZrO_2$ | — | 0.43 | — | — | — | — | 1.51 | 3.01 | 0.95 | — |
| $Nb_2O_3$ | 1.71 | 0.68 | 0.87 | 0.71 | 0.69 | 1.63 | 0.32 | 4.00 | 0.32 | 1.55 |
| NaF | 1.19 | 1.10 | 1.04 | 1.45 | 1.17 | — | 1.23 | 1.07 | — | 1.17 |
| $SnO_2$ | — | — | — | — | 0.42 | 0.35 | — | — | 0.25 | — |

TABLE 1-continued

| | Examples of Embodiments (Contents in weight %) | | | | | | | | | |
|---|---|---|---|---|---|---|---|---|---|---|
| | 1 | 2 | 3 | 4 | 5 | 6 | 7 | 8 | 9 | 10 |
| Fb$_2$O$_3$ | — | — | 0.21 | — | — | — | — | — | 0.25 | — |
| Ca$_2$O$_3$ | — | — | — | — | — | — | — | 0.11 | — | — |
| Sb$_2$O$_3$ | — | — | — | — | — | 0.40 | — | — | 0.50 | — |
| TiO$_2$ | — | — | — | 0.12 | — | — | — | — | — | — |
| nd | 1.5711 | 1.5832 | 1.5620 | 1.5930 | 1.5920 | 1.5791 | 1.6296 | 1.5953 | 1.5950 | 1.5671 |
| vd | 52.63 | 50.88 | 53.92 | 53.90 | 53.97 | 50.33 | 44.31 | 46.51 | 51.46 | 51.09 |
| ρ[g/cm$^3$] | 2.519 | 2.585 | 2.307 | 2.583 | 2.585 | 2.545 | 2.679 | 2.601 | 2.642 | 2.378 |
| SR[1] | <2 | <2 | <2 | <2 | <2 | <2 | <2 | <2 | <2 | <2 |
| OS[2] | 5260 | 7260 | 6110 | 4980 | 5063 | 5721 | 6390 | 8245 | 8920 | 7230 |

[1]SR—Acid resistance: less than 2 means less than 0.1 micrometers removal during treatment for 600 hours with nitric acid (pH 0.3)
[2]OS—Surface stress in pm/cm after 4 hours immersion in molten NaNO$_3$ at 400-440° C.

TABLE 2

| Oxide | 11 | 12 | 13 | 14 | 15 | 16 | 17 | 18 | 19 |
|---|---|---|---|---|---|---|---|---|---|
| SiO$_2$ | 60.20 | 58.00 | 56.64 | 50.00 | 52.50 | 57.00 | 58.00 | 59.00 | 60.00 |
| B$_2$O$_3$ | 6.00 | 8.00 | 8.00 | 7.60 | 5.90 | 7.50 | 7.50 | 6.60 | 6.60 |
| Al$_2$O$_3$ | 1.20 | 1.30 | 1.22 | 2.50 | 2.00 | 1.80 | 1.50 | 1.60 | 1.65 |
| P$_2$O$_5$ | — | — | — | — | 0.70 | — | — | 0.50 | — |
| Li$_2$O | 5.90 | 7.50 | 8.01 | 8.00 | 7.70 | 8.00 | 8.00 | 7.00 | 6.00 |
| Na$_2$O | 5.10 | 5.20 | 5.38 | 6.50 | 6.00 | 5.10 | 6.00 | 6.00 | 5.60 |
| K$_2$O | 5.00 | 5.05 | 5.08 | 5.00 | 5.60 | 6.30 | 6.00 | 6.20 | 7.00 |
| MgO | 1.10 | 1.60 | 1.10 | 1.00 | 0.80 | 0.90 | 0.60 | 1.20 | 0.25 |
| CaO | 1.90 | 1.30 | 1.90 | 0.90 | 0.60 | 0.50 | 0.50 | 1.50 | 0.00 |
| ZnO | — | — | — | — | 0.10 | 1.60 | 1.30 | — | — |
| TiO$_2$ | 12.00 | 11.50 | 8.10 | 9.50 | 8.00 | 8.50 | 10.00 | 8.70 | 9.90 |
| ZrO$_2$ | 1.00 | 0.30 | 2.01 | 1.80 | 2.00 | 1.00 | 0.50 | 0.80 | 0.50 |
| Nb$_2$O$_5$ | 0.90 | 0.15 | 0.92 | 2.50 | 0.80 | 0.55 | — | — | — |
| NaF | — | — | — | — | — | — | — | 0.90 | 0.50 |
| Y$_2$O$_3$ | — | — | 0.87 | 1.30 | 2.50 | 0.50 | — | — | — |
| La$_2$O$_3$ | — | — | 0.77 | 1.50 | — | — | — | — | — |
| WO$_3$ | — | — | — | 1.80 | 2.80 | 0.75 | — | — | — |
| Ta$_2$O$_5$ | — | — | — | — | 0.50 | — | — | — | — |
| PbO | — | — | — | — | 1.50 | — | — | — | — |
| nd | 1.5984 | 1.5970 | 1.5983 | 1.6182 | 1.6076 | 1.5882 | 1.5904 | 1.5811 | 1.5787 |
| vd | 43.09 | 43.80 | 47.30 | 43.32 | 44.82 | 47.05 | 45.97 | 47.47 | 46.35 |
| ρg/cm$^3$ | 2.591 | 2.578 | 2.617 | 2.695 | 2.670 | 2.598 | 2.588 | 2.578 | 2.579 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. An optical and ophthalmic glass with a refractive index greater than or equal to 1.56, an Abbe number greater than or equal to 40 and a density less than or equal to 2.70 g/cm$^3$, consisting essentially of (in % by weight):

SiO$_2$—49-68
B$_2$O$_3$—3-8
Al$_2$O$_3$—0.5-3
P$_2$O$_5$—0-1.5
sum of SiO$_2$, B$_2$O$_3$, Al$_2$O$_3$ and P$_2$O$_5$—60-78
Li$_2$O—3-8
Na$_2$O—4-10
K$_2$O—0-10
sum of M$_2$O (M=Li, Na, K)—9-17
CaO—2-6
MgO—0-3
SrO—0-4
BaO—0-4
ZnO—0-2.97
TiO$_2$—5-12.8
ZrO$_2$—0-6
Nb$_2$O$_5$—0.15-5
F——0-5
sum of CaO, MgO, SrO, BaO, ZnO—1.5-6
Y$_2$O$_3$—0-3.

2. An optical and ophthalmic glass with a refractive index greater than or equal to 1.56, an Abbe number greater than or equal to 40 and a density less than or equal to 2.70 g/cm$^3$, consisting essentially of (in % by weight):

SiO$_2$—49-68
B$_2$O$_3$—3-8
Al$_2$O$_3$—0.5-3
P$_2$O$_5$—0-1.5
sum of SiO$_2$, B$_2$O$_3$, Al$_2$O$_3$ and P$_2$O$_5$—60-78
Li$_2$O—3-8
Na$_2$O—5-7
K$_2$O—0-6
sum of M$_2$O (M=Li, Na, K)—15-17
CaO—0-5
MgO—0-3
SrO—0-4
BaO—0-4
ZnO—0-2.97
TiO$_2$—5-12
ZrO$_2$—0-6
Nb$_2$O$_5$—0.15-5
F——0-1
sum of CaO, MgO, SrO, BaO, ZnO—1.5-6
Y$_2$O$_3$—0-3.

3. An optical and ophthalmic glass with a refractive index greater than or equal to 1.56, an Abbe number greater than or equal to 40 and a density less than or equal to 2.70 g/cm$^3$, consisting essentially of (in % by weight):

SiO$_2$—49 to 68
B$_2$O$_3$—8 to 14
Al$_2$O$_3$—0.5 to 3
GeO$_2$—0 to 3
P$_2$O$_5$—0 to 1.5
sum of SiO$_2$, B$_2$O$_3$, Al$_2$O$_3$ and P$_2$O$_5$—60 to 75
Li$_2$O—6 to 12
Na$_2$O—0.5 to 4.5
K$_2$O—0 to 2
sum of Li$_2$O, K$_2$O and Na$_2$O—8 to 15
MgO—1 to 6
CaO—2 to 8
ZnO—0 to 5
sum of MgO, CaO, ZnO—3 to 18
TiO$_2$—4 to 9.5
ZrO$_2$—0 to 3
Nb$_2$O$_5$—0.3 to 5
NaF—1 to 3.5
Y$_2$O$_3$—0 to 4.

4. An optical and ophthalmic glass with a refractive index greater than or equal to 1.56, an Abbe number greater than or equal to 40 and a density less than or equal to 2.70 g/cm$^3$, consisting essentially of (in % by weight):

SiO$_2$—47 to 58
B$_2$O$_3$—12 to 16
Al$_2$O$_3$—0.5 to 2
Sum of SiO$_2$, B$_2$O$_3$ and Al$_2$O$_3$—68 to 78
Li$_2$O—10 to 15
Na$_2$O—4 to 6
K$_2$O—0 to 1
Sum of Li$_2$O, K$_2$O and Na$_2$O—15 to 17
CaO—4 to 8
MgO—4 to 7
ZnO—0 to 1
sum of CaO, MgO and ZnO—8 to 14
TiO$_2$—7 to 10
ZrO$_2$—0 to 2
Nb$_2$O$_5$—0 to 2
F—0.4 to 1.

5. An optical and ophthalmic glass with a refractive index greater than or equal to 1.56, an Abbe number greater than or equal to 40 and a density less than or equal to 2.70 g/cm$^3$, consisting essentially of (in % by weight):

SiO$_2$—47 to 51
B$_2$O$_3$—10 to 18
Al$_2$O$_3$—0 to 4
Sum of SiO$_2$, B$_2$O$_3$ and Al$_2$O$_3$—58 to 62
Li$_2$O—4 to 12
Na$_2$O—2 to 6
K$_2$O—0 to 4
Sum of Li$_2$O, K$_2$O and Na$_2$O—8 to 16
CaO—1 to 7
MgO—0 to 5
ZnO—0 to 4
sum of CaO, MgO and ZnO—5 to 12
TiO$_2$—5 to 8
ZrO$_2$—0 to 2
Nb$_2$O$_5$—0 to 3
F—0.4 to 1.

6. A glass of claim 1, further consisting essentially of (in % by weight):

SrO—0 to 4
BaO—0 to 4
PbO—0 to 5.

7. A glass of claim 2 further consisting essentially of (in % by weight):

SrO—0 to 4
BaO—0 to 4
PbO—0 to 5.

8. A glass of claim 6, wherein the sum of SrO, BaO, ZnO and PbO (in % by weight), is less than or equal to 10.

9. A glass of claim 1, further consisting essentially of

Nb$_2$O$_5$—0 to 5
Y$_2$O$_3$—0 to 4
La$_2$O$_3$—0 to 8
Ta$_2$O$_5$—0 to 3
SnO$_2$—0 to 3.0 in addition to or instead of NaF
Bi$_2$O$_3$—0 to 2.0
Yb$_2$O$_3$—0 to 3.5
Ce$_2$O$_3$—0 to 3
Sb$_2$O$_3$—0 to 2.5
TeO$_2$—0 to 2
SeO$_2$—0 to 2
WO$_3$—0 to 5.

10. A glass of claim 1, further consisting essentially of (in % by weight):

La$_2$O$_3$—0 to 8
WO$_3$—0 to 5
Ta$_2$O$_5$—0 to 3.

11. An optical and ophthalmic glass with a refractive index greater than or equal to 1.56, an Abbe number greater than or equal to 40 and a density less than or equal to 2.70 g/cm$^3$, consisting essentially of (in % by weight):

SiO$_2$—49-68
B$_2$O$_3$—3-8
Al$_2$O$_3$—0.5-3
P$_2$O$_5$—0-1.5
sum of SiO$_2$, B$_2$O$_3$, Al$_2$O$_3$ and P$_2$O$_5$—60-78
Li$_2$O—3-8
Na$_2$O—4-10
K$_2$O—0-10
sum of M$_2$O (M=Li, Na, K)—9-17
CaO—2-6
MgO—0-3
SrO—0-4
BaO—0-4
ZnO—0-2.97
TiO$_2$—5-12.8
ZrO$_2$—0-6
Nb$_2$O$_5$—0-3
F—0.5-5
sum of CaO, MgO, SrO, BaO, ZnO—1.5-6
Y$_2$O$_3$—0-3.

12. An optical and ophthalmic glass with a refractive index greater than or equal to 1.56, an Abbe number greater than or equal to 40 and a density less than or equal to 2.70 g/cm$^3$, consisting essentially of (in % by weight):

SiO$_2$—49-68
B$_2$O$_3$—3-8
Al$_2$O$_3$—0.5-3
P$_2$O$_5$—0-1.5
sum of SiO$_2$, B$_2$O$_3$, Al$_2$O$_3$ and P$_2$O$_5$—60-78
Li$_2$O—3-8
Na$_2$O—5-7
K$_2$O—0-6
sum of M$_2$O (M=Li, Na, K)—15-17
CaO—0-5
MgO—0-3
SrO—0-4

BaO—0-4
ZnO—0-2.97
TiO$_2$—5-12
ZrO$_2$—0-6

Nb$_2$O$_5$—0-3
F——0.5-1
sum of CaO, MgO, SrO, BaO, ZnO—1.5-6
Y$_2$O$_3$—0-3.

* * * * *